United States Patent [19]

Rachor et al.

[11] 3,912,706

[45] Oct. 14, 1975

[54] LIGNIN COMPOSITION AND PROCESS FOR ITS PREPARATION

[75] Inventors: Donald G. Rachor; Charles H. Ludwig, both of Bellingham, Wash.

[73] Assignee: Georgia-Pacific Corporation, Portland, Oreg.

[22] Filed: Nov. 13, 1972

[21] Appl. No.: 305,922

[52] U.S. Cl................................. 260/124 R; 209/5
[51] Int. Cl............................................... C07g 1/00
[58] Field of Search ................................ 260/124 R

[56] References Cited
UNITED STATES PATENTS
3,141,873  7/1964  Goss................................ 260/124 R Primary Examiner—Lewis Gotts
Assistant Examiner—D. R. Phillips
Attorney, Agent, or Firm—Peter P. Chevis

[57] ABSTRACT

Aminoalkylated lignin cross-linked with polyoxyalkylene linkages is described. The composition is prepared by reacting lignin with a secondary amine and an aldehyde and cross-linking the resulting aminoalkylated lignin with polyoxyalkylene linkages to obtain effective flocculating agents.

22 Claims, No Drawings

LIGNIN COMPOSITION AND PROCESS FOR ITS PREPARATION

This invention relates to novel lignin compounds and a process for their preparation. More particularly, it pertains to a product and a process for the preparation of aminoalkylated lignins cross-linked with polyoxyalkylene linkages to obtain effective coagulants or flocculating agents.

One of the major contributors to pollution of streams and waterways is the effluent discharged into the waterways without proper treatment to remove the fine, colloidal particles of solids dispersed in the effluent. Whilee the large particles may settle out without difficulty, the fine solids do not settle and have to be treated with a flocculating agent or coagulant to coagulate or aggregate the particles before settling. Multivalent salts such as ferric chloride and aluminum sulfate are commonly used for particular systems but are of limited effectiveness even in the systems used. The more effective organic polyelectrolytes are relatively expensive and cannot be economically used in many applications.

The surface active properties of lignins and lignosulfonates have long been recognized, and these products have been used as dispersing and flocculating agents. While it has been known for a number of years that high molecular weight lignin and lignosulfonates, such as obtained by fractionation or polymerization of pulping liquors, function as flocculating agents, these materials do not have sufficient effectiveness for commercial acceptance and are suggested for use mainly as flocculating aids in conjunction with other flocculating agents. Polymerization of lignosulfonates and the reaction of lignins with aldehydes and other reagents, such as disclosed in U.S. Pat. Nos. 3,470,148 and 3,600,308, have not improved the effectiveness of these materials sufficiently to make them commercially attractive.

It is therefore the object of this invention to prepare unique compositions of lignin. A further object is to provide water-soluble lignin compositions which are effective as flocculating agents. A still further object is to provide a method for the preparation of these compositions and a process for their use.

The above and other objects are attained, according to this invention, by cross-linking an aminoalkylated lignin with polyoxyalkylene linkages having a molecular weight in the range of from 120 to 1,000 to cross-link or bridge the lignin molecules to the extent that the compositions are still water-soluble. The aminoalkylated lignin is cross-linked by intermixing the aminoalkylated lignin with a polyoxyalkylene disulfonate ester or polyoxyalkylene dihalide and reacting the mixture in an aqueous medium under alkaline conditions. By cross-linking or bridging the aminoalkylated lignin with the polyoxyalkylene linkages, a composition is obtained where the lignin having cationic properties is cross-linked or bridged by long oxyalkylene chains resulting in the formation of molecules having large three dimensional, cationic irregular entities held together at a distance from each other by non-rigid hydrophilic linkages. These products when dissolved in aqueous medium form loosely bound, flexible molecules having increased area for the adsorption or entrapment of fine colloidal particles in solution to result in flocculation of these particles.

Lignin is a polymeric substance of substituted aromatics found in plant and vegetable tissue associated with cellulose and other plant constituents. In the pulp and paper industry, lignin-containing materials such as wood, straw, corn stalks, bagasse, and other vegetable and plant tissues are processed to recover the cellulose or pulp. The residual pulping liquors containing the lignin as a by-product is thus one of the main sources of lignin. While there is some variation in the chemical structure of lignin, depending upon the plant from which lignin is obtained, place where the plant is grown, and also upon the method used in recovery or isolation of the lignin from the plant tissue, the basic structure and properties of the lignin are similar. All contain active groups, such as active hydrogens through which the aminoalkylation occurs and phenolic hydroxyl groups through which the cross-linking or bridging are believed to be effected. In some cases, it may be necessary to further modify the lignin to increase the active groups. Since the active groups are interrelated, the lignin should contain at least 1.5% by weight of phenolic hydroxyl. At this phenolic hydroxyl content, generally the active hydrogen concentration is sufficient to permit the aminoalkylation of the lignin to the extent of obtaining an enhancement of practical magnitude in the flocculating properties of the product, except for the highly sulfonated lignin which may require a higher portion of active groups. Thus, lignin obtained by any method or from any source may be used in this reaction as long as the lignin is in a form soluble in aqueous alkali and has a sufficient number of active groups.

Since the lignin separated from the plant may be chemically altered somewhat from that found in the plant, the term "lignin", as used herein, means the lignin products which are obtained upon separation from the cellulose or recovered from the plant. In the sulfite pulping process, the lignocellulosic material is digested with a bisulfite or sulfite resulting in the sulfonation of the lignin. In some of the sulfite pulping processes, the lignin obtained may have a phenolic hydroxyl content in the range of 1.5 to 2.2 but may be sulfonated to an extent of containing from 5% to 6% sulfonate sulfur and thusmayhave to be subjected to further cleavage or modifications such as alkaline treatment or reaction with other constituents to decrease the sulfonate sulfur content or increase the active groups to an extent that the sulfonate sulfur content is less than 1½ times the phenolic hydroxyl content. Generrally lignins having a phenolic hydroxyl content of from 2.5% to 5% and less than 3% sulfonate sulfur are preferred. In other methods of recovery or separation of lignin from plant tissue, the lignin may not be sulfonated but may be chemically altered somewhat in some other manner. For example, in residual pulping liquors obtained in sulfate or other alkaline pulping processes, the lignin is present as an alkali metal salt dissolved in the alkaline aqueous liquor and generally contains a sufficient phenolic hydroxyl content to require no further modification. However, the alkali or kraft lignin may be further reacted with other constituents to further increase the active groups. "Hydrolysis lignin" obtained from the hydrolysis of lignocellulosic materials in manufacture of sugar is likewise altered somewhat from that found in the plant but tends to be water insoluble and has to be further modified to solubilize the lignin as well as to increase the phenolic hydroxyl content. Also, the lignin products such as a residual pulping liquor may be subjected to various treatments such as, for example, acid, alkaline or heat treatments or reacted with the other chemicals which may further alter somewhat the lignin constituents. The lignins remain operative as long as the treatment is not so severe as to destroy the basic polymeric structure or decrease the phenolic hydroxyl and active hydrogen content of the lignin below the desired level.

The residual pulping liquors, or the lignin-containing products obtained in the separation or recovery of lignin from the plant, will generally contain lignin of various molecular weights varying from less than 1,000 to over 100,000. The molecules are believed to be irregular particles above 10 angstroms in diameter. These liquors also may contain other constituents besides the lignin. For example, in the sulfite pulping process, the spent sulfite liquor contains lignosulfonates which may be present as salts of cations, such as magnesium, calcium, ammonium, sodium and/or other cations which may have been present during the sulfonation of the lignin. The spent sulfite liquor solids generally contain only about 40 to 65 weight percent of lignosulfonates with the remainder being carbohydrates and other organic and inorganic constituents dissolved in the liquor. Lignin products obtained by other pulping processes may likewise contain other materials such as carbohydrates, degradation products of carbohydrates, and resinous materials which are separated from the cellulosic materials with the lignin. Lignin obtained by hydrolysis of lignocellulosic materials may not contain the carbohydrates but may contain resinous type materials as well as other materials which are not removed by the hydrolysis. It is not necessary to separate the lignin-containing constituents from the other constituents. The lignin product as obtained containing all of the constituents may be aminoalkylated as such or subjected to different treatments such as alkaline, acid, or heat treatment as well as reacted with chemicals to modify or remove some of the non-lignin constituents prior to the reaction with the aldehyde and amine. In addition to increasing the phenolic hydroxyl content, alkaline treatment of a spent sulfite liquor, for example, may also result in desulfonation of the lignosulfonate which is beneficial in decreasing the anionic properties of the lignin and the amine salt formation on the sulfonic acid groups.

While it is not necessary to remove the non-lignin constituents prior to the aminoalkylation reaction or the subsequent cross-linking reaction, generally it is preferred to do so. The non-lignin constituents are usually relatively low molecular weight products and may be easily removed using methods, such as dialysis, gel permeation, chemical precipitation with an acid of calcium hydroxide, or alcohol or solvent extraction as well as other methods well known in the art for the fractionation or recovery of high molecular weight organic polyelectrolytes from lower molecular weight materials. In addition to separating the non-lignin constituents from the lignin material, the lignins may be fractionated in fractions of various molecular weights prior to the aminoalkylation reaction. Further, the lignins, such as spent sulfite liquor, may be reacted to increase the molecular weight by polymerization or condensation such as by heating the lignosulfonate under acid conditions or with relatively small amounts of formaldehyde or other cross-linking agents to cross-link the lignin molecules with 1 to 3 carbon atoms. However, when the lignin is polymerized or condensed, some of the desirable reaction sites are utilized making it generally necessary to further treat the product to increase the active groups. In addition to alkaline treatment, the lignin may be reacted with other constituents or compounds such as phenols and thiophenols to provide more active groups or sites. For example, the lignin as a residual pulping liquor, or after fractionation or polymerization may be phenolated, using well known methods, to attach additional hydroxyphenyl groups to the lignin to provide additional sites for aminoalkylation and cross-linking. By this method, the phenolic hydroxyl content of lignosulfonates can be increased up to about 8 weight percent or higher with from about 3 to 15 weight percent of phenol being generally combined with the lignosulfonate. The sulfonated lignins, such as spent sulfite liquors are usually pretreated, especially if they have been subjected to condensation or polymerization. For alkali lignin such as kraft lignin, the pretreatment already contains from about 3 to 5 weight percent of phenolic hydroxyl.

The aminoalkylated lignin may be prepared by a number of methods known to the art with one of the simple and easy methods being by means of the Mannich reaction where lignin is reacted with formaldehyde or an equivalent aldehyde having no alpha hydrogen such as benzaldehyde or furfural with a secondary amine having from 2 to 8 carbon atoms. The preparation of the aminoalkylated lignins by this method are disclosed in U.S. Pat. Nos. 2,863,780 and 3,407,188 and in U.S. Pat. No. 2,709,696 where the aminoalkylated lignin is prepared in a non-aqueous medium. Secondary amines most commonly used are amines having organic substituents of alkyl radicals of from 1 to 6 carbon atoms, phenyl radicals, and tolyl radicals. In the reaction of the lignin with the amine and formaldehyde, it is believed that reaction occurs by substitution of the active hydrogens of the lignin attached to carbon on the positions ortho or para to the phenolic hydroxyl groups of the lignin and alpha to carboxyl groups. When sulfonated lignins are used, the secondary amine in addition to reacting in the aminoalkylation of the lignin will react with the sulfonic acid groups on the lignin forming amine salts which may have limited solubility in aqueous mediums. The limited water solubility restricts the flexibility of the various means which may be used for the preparation and use of these materials, although the limited water solubility of the final product may be advantageous in the flocculation of particular systems.

In the aminoalkylation reaction, generally stoichiometric or greater amounts of aldehyde and amine are added to react with the available active hydrogens. Since most of the active hydrogens are ortho or para to phenolic groups, it is convenient to base the amount of reactants reacted with the lignin on the phenolic hydroxyl content of the lignin which may be determined by ultraviolet difference analysis or by conductiometric titration. Generally the products obtained will contain organic nitrogen contents of 1 weight percent or higher. For pretreaed lignins and lignins having the higher phenolic hydroxyl contents, the organically combined nitrogen content may be increased to about 4 to 9 weight percent or higher in carrying out the reaction with an excess of aldehyde and amine under normal conditions. When the reaction is carried out in organic media such as in alcohol or dioxane, the aminoalkylated lignin is generally recovered from the reaction mixture prior to reaction with the disulfonate ester or dihalide.

The polyoxyalkylene disulfonate ester or dihalide used for cross-linking molecules are the polyoxyalkylene di-esters and dihalides having oxyalkylene repeating units containing from 2 to 4 carbon atoms. The most readily available di-esters or dihalides are the ones prepared from polyethylene oxide, polypropylene oxide, tetrahydrofuran, and mixtures thereof. However, polyoxyalkylenes prepared from other materials and by other methods may also be used. The carbon atoms of the repeating unit do not have to be in a straight chain but can be branched as long as the straight chain of the repeating unit is of at least 2 carbon atoms linked to the oxygen which may be illustrated by the following general formula:

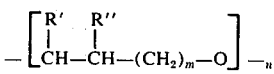

$$-\left[\begin{array}{cc} R' & R'' \\ | & | \\ CH-CH-(CH_2)_m-O \end{array}\right]-_n$$

In the formula, R' and R'' represent hydrogen or alkyl radicals of from 1 to 2 carbon atoms in length. The $n$ represents sufficient number of repeating units to provide linkages of a molecular weight of from 120 to 1000, preferably 200 to 600, and $m$ is a number of from 0 to 2. The bridging or linkages thus generally obtained have a length in the range of from 10 to 80 angstroms. Since the lignin molecules are considered to be large irregular, 3-dimensional molecules, a unique composition is thus obtained whereby these large irregular moelcules are joined by long chains to provide flexible bonding.

A convenient method for the preparation of the disulfonate ester is to react a polyalkylene glycol with a sulfonic acid chloride or bromide. The acid halide reacts readily with the terminal hydroxyl groups of the polyalkylene glycol to form its sulfonate di-ester. In the reaction of the acid chloride with the polyalkylene glycol, HCl is liberated so that the reaction is generally carried out in the presence of an acid acceptor or a base. The base used may be alkali metal or alkaline earth metal, oxides, hydroxides, or carbonates. Tertiary amines may also be used. A convenient means for carrying out the preparation of the ester is to use a tertiary amine such as pyridine as a reaction media. The polyalkylene glycol may be dissolved in an excess pyridine and the acid chloride can be gradually added to the resulting solution. The reaction is vigorous so that room temperature or below is generally used in preparation of the esters. In addition to carrying out the reaction in pyridine, other tertiary amines such as N-methylpiperidine, quinoline, and triethylamine may also be used and will function as the reaction medium as well as the acid acceptor. In addition to using the amines for the reaction medium, the reaction may be carried out in organic solvents such as dioxane, tetrahydrofuran, and dialkyl ethers or alkylene glycols such as 1,2-dimethoxyethane or diglyme. With these solvents, it is generally preferred to use an amine as an acid acceptor; however, dispersion of alkali metal or alkaline earth metal hydroxide, oxide, or carbonate within the organic solvent is likewise operative with the alkali being available to react with the HCl as it is formed. When pyridine is used as a reaction medium, the reaction mixture after reaction is mixed with acidified water to precipitate the di-ester. The di-ester product is then recovered from the precipitated mixture by solvent extraction using solvents such as ethyl ether, ethylene chloride, methylene chloride, chloroform, and other volatile halogenated hydrocarbon solvents. The solvent is generally evaporated under reduced pressure from the extracted product to obtain the di-ester.

The di-ester may also be prepared in an aqueous medium by adding the acid chloride to a stirred, aqueous solution of alkali and the polyalkylene glycol. After the reaction, the product is extracted from the reaction mixture and unreacted reactants by use of aromatic solvents such as benzene, toluene, and xylene or the extracting solvents listed above.

In preparation of the dihalides, the polyalkylene glycols are reacted with the halogenating reagents such as thionyl chloride or bromide, phosphorus tribromide, or pentabromide or phosphorus trichloride. The halogenating agent reacts readily with the terminal hydroxyl of the glycol to form the dihalide which may be readily recovered from the reaction mixture by fractional distillation under reduced pressure. The rate of reaction of the halogenating reagents with the polyalkylene glycol is moderated somewhat by carrying out the reaction in presence of an organic solvent.

While the sulfonate di-esters and dihalides may be purified and recovered from the reaction medium, the di-esters or dihalides may be used or reacted with the lignin without purification except for the removal of the tertiary amine or the organic solvent used for the reaction medium. For example, when the dihalide or sulfonate di-ester is formed using the organic medium, the halide or the ester as obtained upon evaporation of the organic solvent may be used. If an excess of an inorganic oxide, hydroxide, or carbonate was used as an acid acceptor, the alkali remaining with the ester or dihalide will dissolve in the aqueous medium used for the reaction of the dihalide or ester with a lignin and aid in imparting the alkaline conditions used for the reaction.

The cross-linking reaction of the aminoalkylated lignin is effected generally by adding the sulfonate di-ester or the di-halide to an aqueous solution of the aminoalkylated lignin and carrying out the reaction under alkaline conditions. The presumed reaction obtained is illustrated by the following equation showing the reaction of a sulfonate di-ester with the lignin.

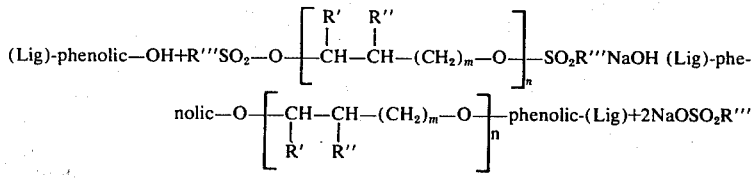

$$(Lig)\text{-phenolic}-OH + R'''SO_2-O-\left[\begin{array}{cc} R' & R'' \\ | & | \\ CH-CH-(CH_2)_m-O \end{array}\right]_n-SO_2R'''\ \xrightarrow{NaOH}\ (Lig)\text{-phenolic}-O-\left[\begin{array}{cc} CH-CH-(CH_2)_m-O \\ | & | \\ R' & R'' \end{array}\right]_n\text{-phenolic-}(Lig) + 2NaOSO_2R'''$$

In the above reaction, R' and R'' as well as $n$ and $m$ represent the same entities as indicated in the formula above, and R''' represents alkyl radicals of from 1 to 6 carbon atoms in length, cyclic radicals of from 3 to 6 carbon atoms such as cyclohexane, or arene radicals of from 6 to 10 carbon atoms such as toluene, p-bromobenzene, benzene, naphthalene, and others such as phenylmethane. In the reaction aminoalkylated lignin solutions containing initially at least 20 to 40 weight percent of solids must be used. Generally the most concentrated solution which can be conveniently handled is preferred. The viscosity of the solutions increase relatively rapidly with concentration which limits the concentration that can be employed. For many solutions, concentrations up to 40 weight percent or higher can be conveiently used. Using a concentrated solution promotes inter- instead of intra-molecular reaction or cross-linking.

While reaction temperatures from 50° to 200°C may be used, it is generally preferred to heat the reaction mixture from about 80°C to reflux temperature. The reaction is fairly rapid and as cross-linking proceeds, the reaction mixture thickens so that additional water may be periodically added to thin the mixture to permit continuing reaction. Alkali such as sodium or potassium hydroxide, oxide or carbonate may also be added with the water to maintain the reaction medium alkaline, preferably at a pH in the range of 8 to 9. Since acid is formed by the reaction, periodic addition of alkali to react with the acid formed in the reaction enables the reaction to be carried out at a more uniform pH than if the alkali were all added at the beginning of the reaction.

Generally, a reaction time of from 15 minutes to 5 hours, preferably in the range of ½ to 2 hours, is sufficient to react an effective amount of the di-ester or di-halide with the lignin to impart the desired flocculating properties. The further advantage of using the lower temperature is that the reaction is more gradual and thus can be more closely controlled. After sufficient extent of interlinking has been obtained, the reaction mixture is neutralized and can be fractionated to recover the high molecular weight cross-linked lignin. Any of the methods commonly known for fractionation of polyelectrolytes or for the recovery of high molecular weight organic compounds from lower molecular weight products may be used. The reaction mixture is commonly dialyzed against running water for periods of time from 8 to 24 hours. If the cross-linked lignin is to be used as a flocculating agent, it is not necessary to recover or remove the low molecular weight constituents from the reaction mixture. The reaction mixture as such may be used. The presence of inorganic salts and the organic sulfonate present in the reaction mixture does not appear to have a deleterious effect upon the flocculation. Often in determining the extent of cross-linking desired, the cross-linking reaction is continued with samples periodically being drawn from the reaction mixture and tested for flocculating properties. The reaction is discontinued when further improvement in flocculating time is not obtained by additional heating or reaction. The amount of the cross-linking agent added to the reaction mixture in reaction with the lignin may be widely varied such that the stoichiometric ratio of the cross-linking agent to the phenolic hydroxyl content of the lignin can be in the range of from 0.4 to 1.5 or greater, preferably being in the range of 0.6 to 1. Generally the reaction is continued until from about 30% to 80% or more of the phenolic hydroxyl groups have been reacted. This extent of cross-linking or interaction of the lignin with the cross-linking agent will result in obtaining effective products. At the higher levels of cross-linking, a major portion of the product may become insoluble. Generally the effectiveness of the insolubilized portion as flocculating agents in aqueous systems is limited. However, the soluble portion remains effective and may be used. When an excess of cross-linking agent or of the sulfonate di-ester is added, preferably the ester is added in increments and the added amount substantially reacted before the additional amount is added. By this procedure, the reaction of both ends of the cross-linking agent is favored to bridge the lignins instead of having only one end of the cross-linking agent react and the other end remain unreacted.

In using the cross-linked aminoalkylated lignin in flocculations of solids from aqueous mediums, the methods and procedures commonly employed for other polyelectrolytes or high molecular weight flococulating agents may be used. The cross-linked aminoalkylated lignin may be used in an amount of from less than 1 to over 1000 parts per million. For flocculation of inorganic particles from relatively dilute solutions such as in treatment of water to remove finely dispersed clay or sediment found in streams and other natural waters in an amount of from 5 to 30 parts per million are usually sufficient. The products are also effective for more concentrated effluents which may contain 5 to 10 or a higher percent of solids such as waste effluent streams. The products are effective for flocculation in acidic, neutral or alkaine mediums.

The following examples further illustrate the invention.

EXAMPLE I

A fermented calcium base spend sulfite liquor having a phenolic hydroxyl content of about 2.2 weight percent based upon the lignosulfonate content of the spent sulfite liquor, was alkaline treated. Sodium hydroxide solution containing 50 weight percent caustic was added to the spent sulfite liquor which had been concentrated to about 50 weight percent solids and the mixture was heated for 80 hours at 90° to 100°C. After alkaline treatment, the reaction mixture was acidified with sulfuric acid to a pH of about 4 to precipitate the lignin. The lignin fraction had a phenolic hydroxyl content of about 4 weight percent and the sulfonic acid content was descreased from 5.2% to 0.7%.

The alkaline treated spent sulfite liquor was aminoalkylated by being reacted with dimethylamine and formaldehyde. The alkaline treated spent sulfite liquor in an amount of 74 grams, on a moisture-free basis, was dissolved in about 232 milliliters of 95% ethanol in a 1 liter, 3-necked flask, equipped with a thermometer, stirrer and reflux condenser. To the lignosulfonate solution, 46 grams of 40% dimethylamine were added after which 20 grams of a 50% formaldehyde were added dropwise over a period of 30 minutes while the temperature in the flask was maintained below 30°C. Based upon the phenolic hydroxyl content of the lignosulfonate, the amount of dimethylamine and the formaldehyde added represented equivalent ratios of 1:2.4 and 1:2.0, respectively. After the addition of the formaldehyde, the reaction mixture was refluxed for 2½ hours at about 82°C. A portion of the reaction mixture was removed and cross-linked with a polyethylene di-ester. The remainder of the reaction mixture was placed on a steam bath to evaporate a major portion of the ethanol and then dried at 90°C at a reduced pressure of 1 millimeter of mercury absolute for 8½ hours to vaporize any of the unreacted amine remaining in the product. The dried product had an organically combined nitrogen content of about 2 weight percent.

The sulfonate di-ester used as a cross-linking agent for the aminoalkylated, alkaline treated spent sulfite liquor was prepared by reacting a polyethylene glycol having an average molecular weight of around 400 with mesyl chloride in pyridine. the polyethylene glycol was dissolved in pyridine and the mesyl chloride was gradually added to the polyethylene solution at a temperature around 10°C. After the mesyl chloride was added, the reaction mixture was stirred for about 2 hours at room temperature. The amount of mesyl chloride added was slightly more than the equivalent amount necessary to react with all of the polyethylene glycol hydroxyl groups. The di-ester product thus obtained was recovered by adding the reaction mixture to acidified ice water and extracting the di-ester product with methylene chloride. The methylene chloride phase was dried by addition of sodium sulfate, and the solvent then removed by evaporation under reduced pressure. A sulfur analysis indicated that substantially complete esterification of the polyethylene glycol was thus obtained.

The dimethylaminomethylated, alkaline treated spent sulfite liquor reaction mixture described above was cross-linked with the mesyl disulfonate ester. The dimethylaminomethylated, alkaline treated spent sulfite liquor reaction mixture in an amount of about 138 grams was added to a 500 milliliter, 3-necked flask equipped with a stirrer and reflux condenser. The concentration of the dimethylaminomethylated, alkaline treated spent sulfite liquor in the reaction mixture was about 24 weight percent so that the 138 grams added amounted to approximately 33 grams of the dimethylaminomethylated alkaline treated spent sulfite liquor on a dry basis. A sodium hydroxide solution containing 50% caustic was added to the reaction flask in an amount of 3.4 grams of solution. The polyethylene glycol sulfonate di-ester was then added to the flask in an amount of 8.7 grams and the reaction mixture refluxed for 30 minutes after which 5.7 grams of additional di-ester were added. The reaction mixture was refluxed for 45 additional minutes, and further additions of the di-ester were made in a total amount of 9.1 grams over a 30 minute period while the reaction mixture was being refluxed. Additional sodium hydroxide was added to maintain the pH of the reaction mixture and the heating continued. Based upon the phenolic hyroxyl content of the aminoalkylated lignin, the stoichiometric ratio of di-ester added was about 1.3:1 and a ratio 0.64:1 of caustic to phenolic hydroxyl. After about 15 minutes of heating, the mixture started to thicken and about 100 milliliters of additional water was periodically added over a period of 20 minutes to maintain the reaction mixture stirrable. After cooling, the reaction mixture ws purified by dialysis against running water using a regenerated cellophane membrane and the product recovered was adjusted to a pH of 5 by addition of sulfuric acid.

The product thus obtained was tested as a flocculating agent by flocculation of clay in an aqueous sytem. A commercially available low-yield clay (Panther Creek) was dispersed in water to obtain a dispersion containing about 4 weight percent of the clay. Sodium chloride was also added in an amount of about 1000 parts per million. A test was carried out by shaking and inverting 100 milliliter samples of the clay suspension at a pH of about 5 in a 100 milliliter graduated cylinder and then noting the time taken for the boundary line of the clay to settle to the half-volume or 50 milliliter mark on the graduate. The clay dispersion with no flocculating agent settled to the 50 milliliter mark in 600 seconds.

In the test, the settling time was determined for the use of the flocculating agent in an amount of about 10 parts per million. The flocculating time obtained was about 86 seconds.

The dimethylaminomethylated alkaline treated spent sulfite liquor prior to cross-linking was also tested as a flocculating agent at 10 parts per million in a manner similar to that described above. The flocculating time for the non-cross-linked dimethylaminomethylated alkaline treated lignosulfonate was 190 seconds.

A second run was then made where a portion of the dried reaction mixture of the alkaline treated lignosulfonate and the dimethylamine and formaldehyde was cross-linked with the dimesylate prepared above. The cross-linking reaction was carried out in a manner similar to that above except that the dried aminoalkylated lignin was dissolved in water and reacted with the mesyl di-ester. The amount of the di-ester used was 5.75 grams which represented a stoichiometric ratio of about 0.7:1 of the sulfonate di-ester to the phenolic hydroxyl content of the aminoalkylated lignin. The aminoalkylated lignin in an amount of 15 grams was dissolved in 30 grams of water to which about 1.6 grams of a 50 weight percent sodium hydroxide solution had been added. The aminoalkylated lignin was dissolved in the solution by heating which was then cooled to 30° and the di-ester was added. The mixture was refluxed for 10 minutes after which the reaction mixture thickened so that 50 milliliters of additional water had to be added. After refluxing the reaction mixture for an additional 30 minutes, cooling it and dialyzing it against running water for 16 hours, the product thus obtained was adjusted to pH 8 and then tested as a flocculating agent in the test above under both acid and alkaline conditions. The test was carried out using the flocculating agent in an amount of 10 parts per million for the flocculation of clay from the aqueous medium at pH 5 and also at pH 9. The settling time at ph 5 was 70 seconds and at pH 9, 80 seconds.

A third run was made in a manner similar to that described in Run 2 except that the aminoalkylated alkaline treated lignosulfonate was cross-linked with a di-ester prepared by reacting the polyethylene glycol with p-toluenesulfonyl chloride to obtain a tosyl di-ester. The aminoalkylated alkaline treated lignosulfonate was cross-linked by being refluxed for 2 hours with the tosyl di-ester. The stoichiometric ratio of the di-ester to the phenolic hydroxyl was 0.6:1. After dialysis, the product obtained gave a settling time of 84 seconds at 10 parts per million in settling the clay from the 4% slurry at pH of 5.

EXAMPLE II

A lignosulfonate was treated with phenol prior to aminoalkylation and cross-linking.

A fermented calcium base liquor was deashed by addition of sulfuric acid to a pH of 0.7 to precipitate the calcium as calcium sulfate. The acidified lignosulfonate was then spray dried. The deashed spray dried, spent sulfite liquor was reacted with phenol by dissolving the deashed lignin in an equal part of molten phenol. The reaction mixture was then heated in a closed container equipped with a reflux condenser and stirrer at a temperature of about 120°C for about 3½ hours. At the end of the reaction time, 250 milliliters of water were added to the mixture and the heating was continued to distill off the unreacted phenol and water mixture under reduced pressure at a temperature of from 70° to 80°C. The remaining mixture was then poured into 3 liters of water, precipitating the major portion of the phenolated lignin. The water was then decanted and the precipitate washed with water. The supernatant and wash water were evaporated on a steam bath and the residue returned to the precipitate. The combined precipitate obtained was boiled in water for 3 hours and dried at atmospheric temperature at 100°C and under reduced pressure of 1 millimeter of mercury to remove any unreacted phenol. The phenolic hydroxyl content of the phenolated lignosulfoante was estimated to be 3.7 weight percent based upon conductiometric titration and the sulfonate sulfur content was less than 1.2%.

The phenolated lignosulfonate was reacted with dimethylamine and formaldehyde in a manner similar to the aminoalkylation reaction described in Example I above. The phenolated lignosulfonate in an amount of 250 grams was dissolved in 820 of 95% ethanol. To the solution, a 25 weight percent aqueous solution of dimethylamine was added in an amount of 422 grams after which 250 grams of a 30 weight percent aqueous solution of formaldehyde was added dropwise to the reaction mixture over a period of 30 minutes while maintaining the reaction temperature below 30°C. After the addition of the formaldehyde, the reaction mixture was heated at 82°C for 2 hours at reflux. Essentially all of the alcohol was then evaporated from the reaction mixture by heating on a steam bath. The residue remaining was boiled with water for 1 hour, filtered and dried under reduced pressure of 0.5 millimeter of mercury for 40 hours at 100°C. The aminoalkylated, phenolated lignosulfonate had an organically combined nitrogen content of about 6.5% determined by subtracting from the Kjeldahl nitrogen analysis the nitrogen removed by distillation upon treatment with an aqueous magnesium hydroxide solution.

The aminoalkylated, phenolated lignosulfonate prepared above was cross-linked with a sulfonate di-ester of a polyalkylane glycol having a molecular weight of around 400. A di-ester was prepared by reacting the polyalkylene glycol with p-toluenesulfonyl chloride in a manner similar to that described in Example I for the preparation of the mesylate di-ester. In the reaction, 23.4 grams of the aminoalkylated lignosulfonate were dissolved in 45 milliliters of water heated to 80° to which 2.4 grams of a 50 weight percent sodium hydroxide solution had been added. After the aminoalkylated lignosulfonate had dissolved in the alkaline solution, 11.8 grams of the tosylate di-ester were added and the reaction mixture heated to reflux. An additional amount of water in an amount of 100 milliliters was added after which the reaction was further heated for about 30 minutes. The reaction mixture was then cooled, the pH adjusted to 5 by addition of hydrochloric acid, and dialyzed against running water using a regenerated cellulose membrane for 18 hours. The solution remaining after dialysis was centrigfuged to remove 14.6 grams of insoluble material on a dry basis. The filtrate obtained was tested as a flocculating agent using the procedure similar to that described in Example I above using the soluble reaction product in an amount of from 1 to 10 parts per million. The results obtained are shown in the table below.

| Amount Used, Parts Per Million | Settling Time, secs. |
|---|---|
| 1 | 230 |
| 2 | 115 |
| 3 | 77 |
| 5 | 60 |
| 10 | 50 |

The above run was repeated except that the amount of the tosyl di-ester used was decreased to 7.8 grams instead of 11.8 as above. This gave a stoichiometric equivalent of the di-ester of around 0.51 based upon the phenolic hydroxyl content of the aminoalkylated lignosulfonate instead of 0.77 as above. Upon acidification and filtration of the mixture, only 2 grams of insoluble precipitate were obtained. The water-soluble reaction product obtained upon being tested as a flocculating agent in the test described above had a flocculating time of 82 seconds.

The above aminoalkylated lignosulfonate was also reacted with a tosylate di-ester wich had been prepared from a polyethylene glycol having a molecular weight of around 600. The amount of the tosylate di-ester used was 11.5 grams which gave a stoichiometric equivalent of 0.6 of the di-ester per phenolic hydroxyl of the aminoalkylated lignosulfonate. About 13 grams of the resulting product was insoluble. The soluble fraction of the reaction product in an amount of about 11 grams was tested as a flocculating agent in a manner described above for flocculation of clay at a pH 5 and had a settling time of 90 seconds.

In a manner similar to that described above, a deashed lignosulfonate obtained from a fermented calcium base liquor was reacted with phenol and aminoalkylated by reaction with dimethylamine and formaldehyde. The aminoalkylated, phenolated lignosulfonate was then cross-linked with a tosyl di-ester prepared from a polyethylene glycol having a molecular weight of around 200. The amount of the cross-linking agent reacted was a stoichiometric equivalent amount of 0.52 the di-ester, based upon the estimated phenolic hydroxyl content of the aminoalkylated lignin. After dialysis and filtration, 26.3 grams of a soluble product were obtained and 0.5 gram was insoluble in water at pH 5. The soluble product when tested as a flocculating agent at 10 parts per million in a manner described above gave a settling time of 65 seconds. The water-soluble portion had an intrinsic viscosity of 0.069 dl/g when the intrinsic viscosity was determined in a 0.1 molar sodium chloride aqueous solution at 25°C.

EXAMPLE III

An alkali or kraft lignin was aminoalkylated and then cross-linked with a tosyl di-ester prepared from a polyethylene glycol having an average molecular weight of 400.

The kraft lignin was aminoalkylated by dissolving 11.4 grams of oven-dried kraft lignin in ethanol solution containing 28 milliliters of water and 42 milliliters of 95% ethanol. An aqueous solution of 40% dimethylamine was added to the lignin solution in an amount of 17 grams. The mixture was cooled to 22°C and 10.6 grams of 37% solution of formaldehyde was added dropwise over a 30 minute period while the reaction mixture was stirred. After the addition of the formaldehyde, the reaction mixture was stirred for an additional 30 minutes at about 25°C and then refluxed for 2¼ hours at a temperature of about 84°C. The product was dried on a steam bath to yield about 12.2 grams of product. The kraft lignin prior to the aminoalkylation had a phenolic hydroxyl content of about 3%. The aminoalkylated lignin had an organic nitrogen content of 1.7 weight percent.

The above aminoalkylated lignin was then cross-linked with a tosylate di-ester obtained by reacting a polyethylene glycol having an average molecular weight of around 400 with n-toluenesulfonyl chloride. In the cross-linking reaction, 7 grams of the aminoalkylated kraft lignin were reacted with 4.5 grams of the di-ester and 0.4 gram of sodium hydroxide. The above amounts represented a stoichiometric equivalent of 0.69 of di-ester and 0.67 of caustic based upon the estimated phenolic hydroxyl content of the aminoalkylated kraft lignin. After refluxing the reaction mixture for about 5 minutes, the reaction mixture thickened to the extent that 24 milliliters of water were added in several increments and the reaction continued for about 50 additional minutes.

The reaction product thus obtained without purification was then tested as a flocculating agent in the flocculation of a clay slurry at a pH of 5 and also at pH 9 in a manner similar to that described in Example I. The product when used in an amount of about 10 parts per million gave a flocculating time of 60 seconds at pH 5 and 55 seconds at pH 9.

To show the effect of the aminoalkylation, a kraft lignin which was not aminoalkylated but cross-linked with a tosyl di-ester in a manner similar to that above gave a settling time in a similar test of 96 seconds and 97 seconds at pH 5 and 9, respectively. The aminoalkylation of the cross-linked product above did not improve the settling time but had a deleterious effect. When a sample of the above cross-linked kraft lignin was subjected to an aminoalkylation reaction by reacting the cross-linked kraft lignin with dimethylamine and formaldehyde, the settling time for the product at pH 5 and 9 increased from 96 and 97 to 110 and 117 seconds, respectively.

What is claimed is:

1. A process for the preparation of a water-soluble aminoalkylated lignin cross-linked with polyoxyalkylene linkages which comprises reacting a lignin having a phenolic hydroxyl content of at least 1.5 weight percent and a sulfonate sulfur content of less than 1½ times the phenolic hydroxyl content with a secondary alkylamine of from 2 to 8 carbon atoms having alkyl radicals of from 1 to 6 carbon atoms with an aldehyde selected from the group consisting of formaldehyde, benzaldehyde, and furfural to obtain an aminoalkylated lignin containing at least 1% organic nitrogen and cross-linking the aminoalkylated lignin with polyoxyalkylene linkages of from 120 to 1000 molecular weight by reacting the aminoalkylated lignin with a polyoxyalkylene sulfonate di-ester or polyoxyalkylene dihalide to the extent that from 30% to 80% of the phenolic hydroxyl content of the aminoalkylated lignin has been reacted, said polyoxyalkylene linkages having a molecular weight of from 120 to 1000 and repeating units of from 2 to 4 carbon atoms.

2. A process according to claim 1 wherein the polyoxyalkylene compound reacted with the lignin is a polyoxyalkylene di-ester of a monosulfonic acid.

3. A process according to claim 2 wherein the polyoxyalkylene di-ester of monosulfonic acid is a polyoxyethylene di-ester of a polyethylene glycol having a molecular weight in the range of 200 to 600 and the lignin is an alakali lignin.

4. A composition according to claim 2 wherein the polyoxyalkylene di-ester of monosulfonic acid is a polyoxyethylene di-ester of a polyethylene glycol having a molecular weight in the range of 200 to 600 and the lignin is a lignosulfonate having a phenolic hydroxyl content of from 2.5 to 5 weight percent and a sulfonate sulfur content less than 3 weight percent.

5. A process according to claim 4 wherein the aldehyde is formaldehyde (and the secondary amine is an alkylamine).

6. A process according to claim 5 wherein the lignin is a phenolated lignosulfonate.

7. A process according to claim 5 wherein the lignin is an alkaline treated lignosulfonate.

8. A process according to claim 5 wherein the aminoalkylated lignin is intermixed with the polyoxyalkylene compound in a stoichiometric ratio of from 0.4:1 to 1.5:1 of the polyoxyalkylene compound to the aminoalkylated lignin based upon the phenolic hydroxyl content of the lignin and reacted at a temperature in the range of from 50° to 200°C for from ¼ to 5 hours.

9. A process according to claim 8 wherein the polyoxyalkylene compound is a polyoxyethylene di-ester of monosulfonic acid prepared by reacting a polyethylene glycol having a molecular weight in the range of 200 to 600 with a sulfonyl halide and reacted at a temperature of 80°C to the reflux temperature of the reaction mixture for from ½ to 2 hours.

10. A process according to claim 9 wherein the lignin is an alkali lignin.

11. A process according to claim 9 wherein the lignin is a phenolated lignin prepared by reacting phenol with a lignosulfonate.

12. A composition prepared according to claim 1.
13. A composition prepared according to claim 5.
14. A composition prepared according to claim 6.
15. A composition prepared according to claim 7.
16. A composition prepared according to claim 9.
17. A composition prepared according to claim 10.
18. A composition prepared according to claim 11.
19. A process according to claim 10 wherein the amine is dimethylamine.
20. A process according to claim 11 wherein the amine is dimethylamine.
21. A composition prepared according to claim 19.
22. A composition prepared according to claim 20.

* * * * *